(12) United States Patent
Shmueli et al.

(10) Patent No.: US 9,712,548 B2
(45) Date of Patent: Jul. 18, 2017

(54) PRIVILEGED ANALYTICS SYSTEM

(71) Applicant: Cyber-Ark Software Ltd., Petach-Tikva (IL)

(72) Inventors: Aviram Shmueli, Tel-Aviv (IL); Andrey Dulkin, Herzlia (IL); Yair Sade, Herzlia (IL); Assaf Weiss, Petach-Tikva (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

(21) Appl. No.: 14/524,145

(22) Filed: Oct. 27, 2014

(65) Prior Publication Data
US 2015/0121518 A1    Apr. 30, 2015

Related U.S. Application Data

(60) Provisional application No. 61/896,089, filed on Oct. 27, 2013.

(51) Int. Cl.
*H04L 29/06* (2006.01)

(52) U.S. Cl.
CPC .............................. *H04L 63/1425* (2013.01)

(58) Field of Classification Search
CPC combination set(s) only.
See application file for complete search history.

(56) References Cited

U.S. PATENT DOCUMENTS

| | | | |
|---|---|---|---|
| 6,405,318 B1 * | 6/2002 | Rowland | G06F 21/552 726/22 |
| 7,103,679 B2 | 9/2006 | Bonn | |
| 7,552,480 B1 * | 6/2009 | Voss | G06F 21/577 380/277 |
| 8,082,349 B1 | 12/2011 | Bhargava et al. | |
| 8,082,590 B2 | 12/2011 | Kim et al. | |

(Continued)

FOREIGN PATENT DOCUMENTS

WO    WO 2011/018736    2/2011

OTHER PUBLICATIONS

Official Action Dated Sep. 14, 2015 From the US Patent and Trademark Office Re. U.S. Appl. No. 14/253,945.

(Continued)

*Primary Examiner* — Taghi Arani
*Assistant Examiner* — Phy Anh Vu

(57) ABSTRACT

A computer-implemented method for determining whether a computer network is compromised by unauthorized activity on the computer network. The computer-implemented method comprises identifying a behavioral anomaly of an entity on the computer network, classifying the anomaly as a system event based on an assigned score for the anomaly being at least at a predetermined score threshold, updating an incident based on at least one common parameter between the system event and other system events which comprise the incident, each system event of the incident including an assigned score from when the event was an anomaly, updating a system status based on at least the incident, and assigning a system status score to the system status, and, determining whether the system status score is at least at a predetermined threshold system status score indicating that the computer network may be compromised.

16 Claims, 11 Drawing Sheets

(56) References Cited

U.S. PATENT DOCUMENTS

| | | | |
|---|---|---|---|
| 8,429,708 B1 | 4/2013 | Tandon | |
| 8,478,708 B1 * | 7/2013 | Larcom | G06Q 10/10 |
| | | | 706/52 |
| 8,701,167 B2 | 4/2014 | Kovalan | |
| 8,972,325 B2 * | 3/2015 | Varghese | G06N 99/005 |
| | | | 706/47 |
| 9,471,778 B1 * | 10/2016 | Seo | H04L 63/1425 |
| 2002/0174183 A1 * | 11/2002 | Saeidi | G06F 17/211 |
| | | | 709/206 |
| 2003/0191627 A1 | 10/2003 | Au | |
| 2005/0203881 A1 | 9/2005 | Sakamoto et al. | |
| 2006/0080410 A1 | 4/2006 | McIarty et al. | |
| 2007/0050587 A1 | 3/2007 | Palapudi et al. | |
| 2007/0199068 A1 | 8/2007 | Russinovich et al. | |
| 2007/0204257 A1 | 8/2007 | Kinno et al. | |
| 2007/0294187 A1 | 12/2007 | Scherrer | |
| 2008/0034424 A1 | 2/2008 | Overcash et al. | |
| 2008/0222706 A1 | 9/2008 | Renaud et al. | |
| 2008/0263661 A1 | 10/2008 | Bouzida | |
| 2008/0311896 A1 * | 12/2008 | Karaoguz | H04W 92/02 |
| | | | 455/416 |
| 2009/0064337 A1 * | 3/2009 | Chien | G06F 21/564 |
| | | | 726/25 |
| 2009/0222304 A1 | 9/2009 | Higgins et al. | |
| 2009/0271863 A1 | 10/2009 | Govindavajhala et al. | |
| 2009/0293121 A1 * | 11/2009 | Bigus | G06F 21/316 |
| | | | 726/22 |
| 2010/0037166 A1 * | 2/2010 | Chandrasekar | G06Q 30/02 |
| | | | 715/769 |
| 2010/0158220 A1 | 6/2010 | Silverman | |
| 2010/0269175 A1 * | 10/2010 | Stolfo | G06F 21/55 |
| | | | 726/22 |
| 2011/0225644 A1 * | 9/2011 | Pullikottil | H04L 63/1425 |
| | | | 726/11 |
| 2011/0247059 A1 | 10/2011 | Anderson et al. | |
| 2011/0257992 A1 | 10/2011 | Scantland et al. | |
| 2012/0005192 A1 | 1/2012 | Bao et al. | |
| 2012/0036255 A1 | 2/2012 | Polsky | |
| 2012/0163196 A1 | 6/2012 | Jansen et al. | |
| 2012/0210388 A1 * | 8/2012 | Kolishchak | G06F 21/552 |
| | | | 726/1 |
| 2012/0278890 A1 * | 11/2012 | Maatta | H04L 63/1425 |
| | | | 726/23 |
| 2013/0007883 A1 * | 1/2013 | Zaitsev | G06F 21/561 |
| | | | 726/24 |
| 2014/0033307 A1 | 1/2014 | Schmidtler | |
| 2014/0259156 A1 * | 9/2014 | Beutel | H04L 63/1416 |
| | | | 726/22 |
| 2015/0113600 A1 | 4/2015 | Dulkin et al. | |
| 2015/0121461 A1 | 4/2015 | Dulkin et al. | |
| 2015/0121518 A1 * | 4/2015 | Shmueli | H04L 63/1425 |
| | | | 726/22 |
| 2015/0304349 A1 | 10/2015 | Bernstein et al. | |
| 2016/0142435 A1 | 5/2016 | Bernstein et al. | |

OTHER PUBLICATIONS

European Search Report and the European Search Opinion Dated Mar. 3, 2015 From the European Patent Office Re. Application No. 14190036.5.

European Search Report and the European Search Opinion Dated Feb. 20, 2015 From the European Patent Office Re. Application No. 14187430.5.

Official Action Dated Jan. 21, 2015 From the US Patent and Trademark Office Re. U.S. Appl. No. 14/061,835.

Cyber-Ark "Application Identity Manager™", Cyber Ark Software, Ltd., Datasheet, 2 P.

Cyber-Ark "Application Password Management", Cyber-Ark Software Ltd., Datasheet, 2 P., Feb. 2007.

Cyber-Ark "Enterprise Password Vault™ 4.5", Cyber-Ark Software Ltd., Brochure, 4 P., Nov. 2007.

Cyber-Ark "On-Demand Privileges Manager™ for Unix/Linux", Cyber Ark Software, Ltd., Datasheet, 2 P.

Cyber-Ark "On-Demand Privileges Manager™ for Windows", Cyber Ark Software, Ltd., Datasheet, 2 P.

Cyber-Ark "On-Demand Privileges Manager™", Cyber-Ark Software Ltd., Brochure, 2 P., Apr. 2010.

Cyber-Ark "Privileged Identity Management 5.0", Cyber-Ark Software Ltd., Brochure, 4 P., Apr. 2009.

Cyber-Ark "Privileged Identity Management Suite 7.0", Cyber-Ark Software, Ltd., PIM Brocure, 4 P.

Cyber-Ark "Privileged Session Management Suite 7.0", Cyber Ark Software, Ltd., PSM Brochure, 4 P.

Cyber-Ark "Privileged Session Manager™", Cyber-Ark Software Ltd., Datasheet, 2 P., Mar. 2009.

Official Action Dated Jun. 17, 2015 From the US Patent and Trademark Office Re. U.S. Appl. No. 14/061,835.

Official Action Dated Aug. 31, 2015 From the US Patent and Trademark Office Re. U.S. Appl. No. 14/058,254.

Notice of Non-Compliant Amendment Dated Feb. 11, 2016 From the US Patent and Trademark Office Re. U.S. Appl. No. 14/058,254.

Official Action Dated May 5, 2016 From the US Patent and Trademark Office Re. U.S. Appl. No. 14/253,945.

Restriction Official Action Dated May 12, 2016 From the US Patent and Trademark Office Re. U.S. Appl. No. 14/540,289.

\* cited by examiner

Working Hours Profile:

| ID | LOG002 |
|---|---|
| Username | David |
| Day in the week | Monday-Thursday |
| Average activity time | 12:00 |
| Standard deviation | 3.5 |
| Time | 20/12/2023 9:51 |

← 402

Audit Record data structure:

| ID | LOG002 |
|---|---|
| Time | 13/1/2023 10:01 |
| User | U1 |
| Action | Logon |
| IP | 1.2.3.4 |

← 404a

Event data structure:

| ID | Event314 |
|---|---|
| Time | 13/1/2023 10:12 |
| Risk index | 60 |
| Risk Label | Medium |
| Status | Active |
| #Logs | 1 |
| LOG ID | LOG002 |

← 404b

Incident data structure:

| ID | Incident516 |
|---|---|
| Time | 13/1/2023 11:12 |
| Risk index | 70 |
| Risk Label | High |
| Status | Active |
| #Events | 1 |
| Event ID | Event135 |

← 404c

System status structure:

| ID | Status210 |
|---|---|
| Time | 13/1/2023 11:20 |
| Risk index | 70 |
| Risk Label | High |

OVERALL RISK

Severe

INCIDENT SUMMARY                              Hide

ID 1F789D - Privileged access during irregular hours

Sunday, Jun. 30, 2023 05:00:00pm

Vault user 'PAUL' retrieved the password of privileged user 'root' on machine 'BANK.PROD.1' at irregular hour.

⊕ DETAILS

Risk Index:                              95 (HIGH)
Status:                                   ACTIVE

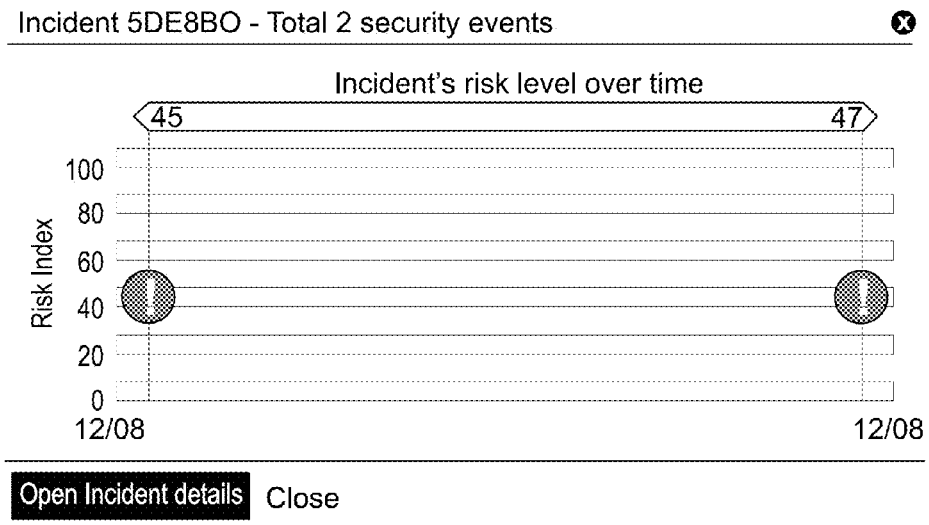

FIG. 14

DESCRIPTION:
Incident consists of 2 security events spanning over 2 minutes.
2 security events are related to "Privileged access not through PIM".
Target machine Cent OS-64 Bit-Base is a common denominator, appearing in 2 of 2 security events.

| – EVENTS(2) | | | | | | |
|---|---|---|---|---|---|---|
| ID | Score | User | Privileged user | Affected asset | Event type | Detect. timestamp ▼ |
| ⊞ 5DE8B1 | 45 | | unixteam | CentOS-64Bit-B... | Access not via Cyber-Ark | 12/08/2023 12:55:30pm |
| Privileged user unixteam accessed machine CentOS-64Bit-Base at 12:55:30pm not through Cyber-Ark PIM. The action was flagged as a security event because user unixteam is not managed in Cyber-Ark PIM. | | | | | | |
| • 5DE8AE | 45 | | unixteam | CentOS-64Bit-B... | Access not via Cyber-Ark | 12/08/2023 12:53:42pm |
| Privileged user unixteam accessed machine CentOS-64Bit-Base at 12:53:42pm not through Cyber-Ark PIM. The action was flagged as a security event because user unixteam is not managed in Cyber-Ark PIM. | | | | | | |

FIG. 15

PRIVILEGED ANALYTICS SYSTEM

RELATED APPLICATION

This application claims the benefit of priority under 35 USC 119(e) of U.S. to Provisional Patent Application No. 61/896,089 filed Oct. 27, 2013, the contents of which are incorporated herein by reference in their entirety.

BACKGROUND

The present invention, in some embodiments thereof, relates to cyber attacks on an organizational network and, more specifically, but not exclusively, to detecting cyber attacks by detecting abnormal user activity on the organizational network.

The cyber threats landscape is constantly changing. Sophisticated cyber attacks to organizational networks, whether backed by governments, companies or criminal organizations, are becoming frequent occurrences. These cyber attacks pose a threat both to businesses and governments.

The present generation of cyber-attacks operates with a multitude of attack vectors and comprises several attack phases. By nature, these attacks do not rely on previously discovered vulnerabilities, but rather, they use new techniques that exploit unknown vulnerabilities in the organizational network infrastructure.

Traditional signature-based security fails to address the present generation of cyber-attacks. It simply cannot accurately detect such cyber-attacks, with the detection rate being low and the rate of false alarms for a cyber-attack being detected is high.

SUMMARY

According to some embodiments of the present invention, there is provided a computer-implemented method for determining whether a computer network is compromised by unauthorized activity on the computer network. The method comprises identifying, by a computer system, a behavioral anomaly of an entity on the computer network, classifying, by the computer system, the anomaly as a system event based on an assigned score for the anomaly being at least at a predetermined score threshold, updating, by the computer system, an incident based on at least one common parameter between the system event and other system events which comprise the incident, each system event of the incident including an assigned score from when the event was an anomaly, updating, by the computer system, a system status based on at least the incident, and assigning a system status score to the system status; and, determining, by the computer system, whether the system status score is at least at a predetermined threshold system status score indicating that the computer network may be compromised.

Optionally, additionally comprising, adding user feedback obtained through an interface to additionally determine whether the computer network is compromised.

Optionally, wherein the at least one parameter is selected from the group consisting of a user, an application used on the computer network, an internet protocol used on the computer network, source machine, target machine and a time.

Optionally, further comprising obtaining input data representative of information on actions in the computer network, building a first behavior profile for the entity, the first behavioral profile built based on a statistical analysis of the input data, obtaining additional input data representative of information on actions in the computer network. The behavioral anomaly is identified by an analysis of the additional input data against the first behavioral profile to detect anomalies or deviations from the first behavioral profile.

More optionally, the computer-implemented method further comprises building a second behavior profile when the behavioral anomaly is identified found, the second behavior profile different from the first behavior profile and electing based on pre-defined logic, a leading profile from a group consisting of the first behavioral profile, the second behavioral profile, and a combination of the first behavioral profile and the second behavioral profile.

More optionally, wherein the leading profile is used to calculate a score of events and incidents.

According to some embodiments of the present invention, there is provided a computer-implemented method for calculating a profile of entity behavior. The method comprises obtaining, by a computer system, input data representative of information on actions in computer network, building, by the computer system, a first behavior profile for an entity associated with the computer network, the first behavioral profile built based on a statistical analysis of the input data, obtaining, by the computer system, additional input data representative of information on actions in computer network, analyzing, by the computer system, the additional input data against the first behavioral profile to detect anomalies or deviations from the first behavioral profile, building, by the computer system, a second behavior profile, if such anomalies or deviations were found, the second behavior profile different from the first behavior profile and, selecting, by the computer system, based on pre-defined logic, a leading profile, the leading profile being either the first behavioral profile or the second behavioral profile or a combination thereof.

Optionally, wherein the leading profile is used to calculate a score of events and incidents in the system.

Optionally, wherein the entity is a member of a group consisting of: a human user, application, client machine, device type, target machine, account, and command.

According to some embodiments of the present invention, there is provided a computer system for determining whether a computer network is compromised by unauthorized activity on the computer network. The system comprises an input module configured for receiving input data representative of information on actions in a computer network, a profile building module configured for building a behavior profile for an entity associated with the computer network, the profile built based on at least one of a statistical analysis or a rules based analysis of the input data and, an analytics module configured for: 1) analyzing the input data against the behavioral profile and determining anomalies based on the analysis, 2) classifying the anomaly as a system event based on an assigned score for the anomaly being at least at a predetermined score threshold; 3) classifying the system event as an incident based on at least one common parameter between the system event and other system events which comprise the incident, each system event of the incident including an assigned score from when the event was an anomaly; 4) classifying a system status based on number and score of the incidents currently existing in the system, and assigning a system status score to the system status.

Optionally, additionally comprising a user interface module configured for providing a graphical user interface for presenting the system status, the incidents and the events to users.

Optionally, wherein the input module is additionally configured for receiving feedback from the users responding to at least one of the system status, the incidents and the events, presented by the graphical user interface, the feedback to additionally determine whether the computer network is compromised.

According to some embodiments of the present invention, there is provided a computer program product for determining whether a computer network is compromised by unauthorized activity on the computer network, the computer program product comprising a non transitory computer readable storage medium having program instructions embodied therewith, the program instructions executable by a processor to cause one or more servers to: identify a behavioral anomaly of an entity on the computer network, classify the anomaly as a system event based on an assigned score for the anomaly being at least at a predetermined score threshold, update an incident based on at least one common parameter between the system event and other system events which comprise the incident, each system event of the incident including an assigned score from when the event was an anomaly, update a system status based on at least the incident, and assigning a system status score to the system status and, determine whether the system status score is at least at a predetermined threshold system status score indicating that the computer network may be compromised.

Optionally, the program instructions are adapted to cause one or more servers to add user feedback obtained through an interface to additionally determine whether the computer network is compromised.

Optionally, the at least one parameter is selected from the group consisting of a user, an application used on the computer network, an internet protocol used on the computer network, source machine, target machine and a time.

Optionally, the program instructions are adapted to: obtain input data representative of information on actions in the computer network, build a first behavior profile for an entity associated with the computer network, the first behavioral profile built based on a statistical analysis of the input data, obtain additional input data representative of information on actions in the computer network. The behavioral anomaly is identified by an analysis of the additional input data against the first behavioral profile to detect anomalies or deviations from the first behavioral profile.

Optionally, the program instructions are adapted to: build a second behavior profile when the behavioral anomaly is identified found, the second behavior profile different from the first behavior profile and select based on pre-defined logic, a leading profile from a group consisting of the first behavioral profile, the second behavioral profile, and a combination of the first behavioral profile and the second behavioral profile.

More optionally, the leading profile is used to calculate a score of events and incidents.

Optionally, the entity is a member of a group consisting of: a human user, application, client machine, device type, target machine, account, and command.

Throughout this document, a "user" or "users" are personnel in an organization, associated with an organizational network, that are able to perform numerous activities on the organizational network, such as logging in to remote machines, changing passwords, and other activities for which permissions are needed from system administrators and other authorities. In a cyber attack, attackers will often attempt to impersonate legitimate users, by hijacking and exploiting their user accounts and permissions. Thus, for a system as described in this invention, the perceived "user" can also, in reality, be a malicious actor impersonating the user.

Throughout this document, an "administrator" refers to the operator of the system, including an organizational network.

Throughout this document, a "profile" is a mathematical representation of specific network entity normal behavior. The profile may be created either by defining fixed rules in advance or by observing network entity behavior and statistically predicting the expected behavior. For instance, a working hours profile of a user could be the time period from 09:00-17:00.

Throughout this document, a "network entity" may be one of the following types, or a combination of one or more of the types. The first type is a user, which may include a human user, an application, a client machine, a device type, a target machine, an account, and/or human or machine, which performing the requisite action (action subject to system 100 analysis). For example, such user may be a system administrator. Another type of entity is a target. The target may include a machine, account, application, device, command or other resource on which the requisite action was performed. For example, such target may be a network resource, such as a Linux server. Yet another type of entity is the action which is performed on target resource by a user. For example, such action may be a command to shut down a Linux server, for which a profile may be built, describing the times of days that this command was executed in the entire network over the course of one year.

Throughout this document, "rules" include a set of predetermined limits and constraints which define a certain expected behavior.

Throughout this document, an "anomaly" is a statistical deviation from the calculated profile, thus representing a deviation from the normal behavior, i.e.

Throughout this document, an audit record is a raw audit log as generated externally to a system due to network entity activity. The audit log is used as an input by the system to create profiles and to detect anomalies.

Throughout this document, an "event" is one or more audit records that are considered by the system to be an anomaly. Each event receives an event score, which is determined according to its deviation from the normal profile.

Throughout this document, an "incident" is an event or group of events, which are grouped together by a common parameter.

Throughout this document, "system status" is a numerical indication to the extent of which the system "thinks" that the organization is currently under attack. Analysis of incidents results in a System Status.

Throughout this document, "analytics entities" include audit records, events, incidents and system status.

Throughout this document, a "leading profile" is a profile that is currently considered to be the most accurate representation of a network entity behavior. Other profiles for same entities may exist in the system.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a data structure in accordance with embodiments of the present invention;

FIG. 14 shows and incident graph, according to some embodiments of the present invention; and FIG. 15 shows an incident details page, according to some embodiments of the present invention.

DETAILED DESCRIPTION

Figure 1:
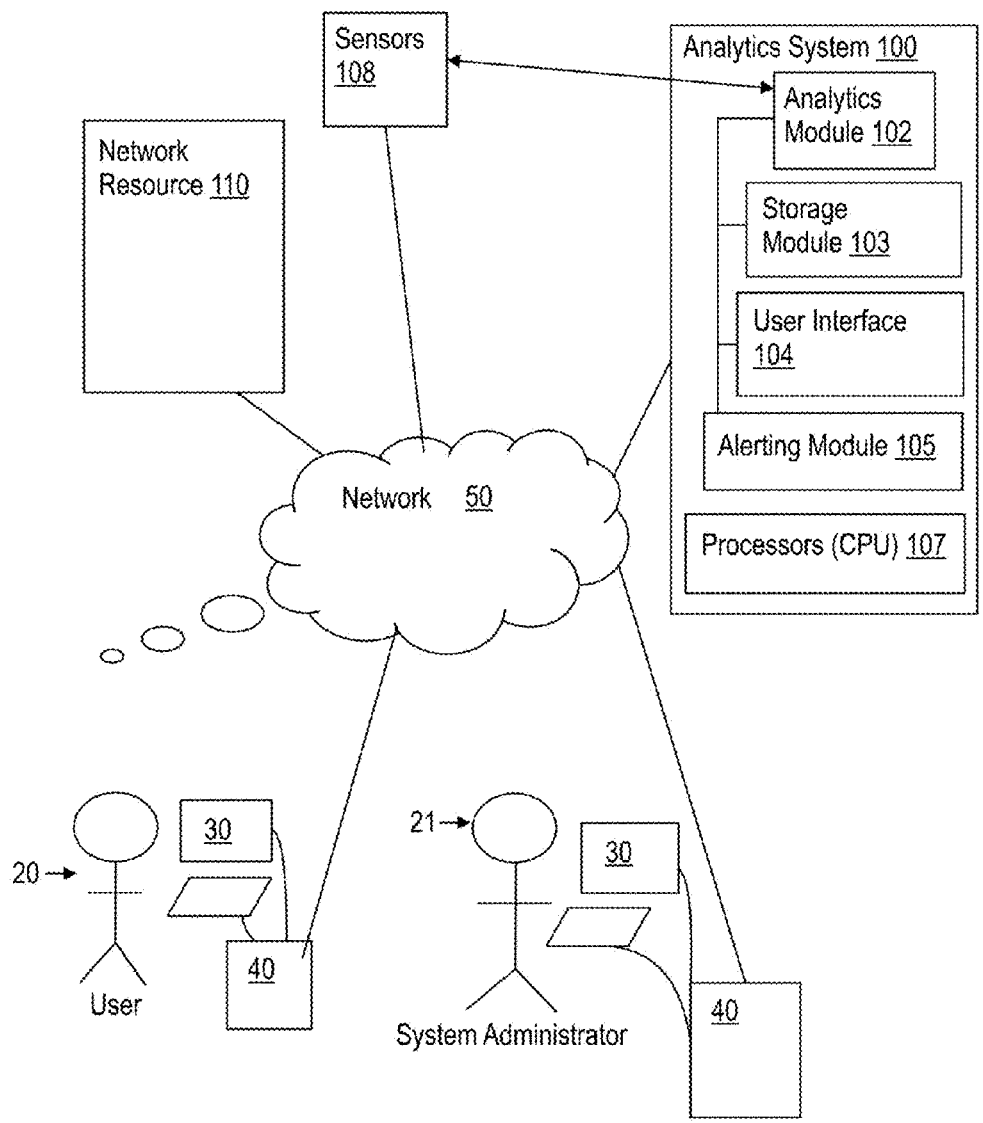
FIG. 1 is a diagram of an exemplary environment on which embodiments of the present invention are performed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention disclose methods and systems which employ artificial intelligence to detect abnormal user activities on, for example, an organizational network, and such as for machines controlled by the organization, which are linked to the organizational network. The disclosed methods and systems are able to detect cyber attacks with low rates of miss detection and false alarms. The methods and systems operate, for example, by identifying normal behavior within the massive amount of data on the organizational network, and to look for deviations from this normal behavior. These disclosed methods and systems provide an interactive interface for viewing the detected anomalies and performing common tasks. Also, document data storage is implemented by the disclosed methods and systems in order to support non-structured input.

Embodiments of the present invention disclose methods and systems for creating and managing parallel profiles. The parallel profiles are created dynamically, and based on the input data received, a leading profile is selected. This selected leading profile is used for analysis against the input data to detect anomalies. This dual profiling is used, for example, to compensate for behavioral trends that may initially appear as anomalies, but over a time period become indicative of normal behavior on the organizational network.

Embodiments of the present invention disclose methods and systems that implements heuristics to elevate a lower-level analytics entity to higher one. Analytics entities are the basic structures that describe the analysis results. The entities are: Audit record, Event, incident and system status. This elevation allows a system administrator to view potential threats to the organizational network while a behavior pattern is developing. This proactive approach allows the system administrator to mitigate such potential threats before the organizational network becomes compromised.

Embodiments of the present invention also disclose methods and systems for presenting interactive reports on user activities on the organizational network. The reports are presented through a graphical user interface, and allow for interaction by the system administrator. The reports detail incidents in the organizational network, allowing for the system administrator to view each incident, by a score representative of the severity of the incident, a color indicating the risk level of the incident, as a bubble thickness, indicating whether the incident has been reviewed by the system administrator. This graphic presentation allows the system administrator to see and understand all system activity at a single source. The system administrator may investigate each incident and provide feedback on each incident, in order to mitigate the incident and ensure a lower risk environment.

Reference is now made to FIG. 1, which shows an operating environment for a non-limiting exemplary system 100, also known as an analytics system, in accordance with some embodiments of the present invention. The analytics system 100 provides analytics, which are used to detect abnormal network entities actions on an organizational network. These abnormalities are then electronically presented to a system administrator 21 (detailed below) or other person of authority, for further incident mitigation. The analytics system 100 includes an analytics module 102, a storage module 103, a user interface module 104, and an optional alerting module 105.

The Analytics System 100, sensors 108 and a network resource 110, representative of multiple network resources, are addressable over a network 50, and linked to the network 50, either directly or indirectly. The network 50 is, for example, an organizational network and includes communications networks, such as Local Area Networks (LAN), Wide Area Networks (WAN), including public networks such as the Internet, or combinations thereof. Users, represented by user 20, both authorized and unauthorized for the network resource 110, using a client computer (referred to herein as a "client") 40 and display 30, interact with the analytics system 100, PAMS 102, sensors 104 and network resources, represented by the network resource 110, via the network 50. Other users 20 may be system administrators 21 (with their computer 40 linked to the network 50, and display 30) and the like, and are identified herein as such.

The analytics system 100 couples with the optional sensors 108 and the network resource 110, for example, either linked via the network 50 or through direct connections. The network resource 110 is, for example, a target resource, which is accessed, for example, through a login procedure or other user authentication session.

The analytics system 100 utilizes hardware, software and combinations thereof, for detecting abnormal network entities activities, known as "anomalies" on the organizational network and/or the resources linked thereto. These anomalies can then displayed to a system administrator or the computer emergency/incident response team (CERT/CIRT) for the organization, for mitigation of incidents associated with the detected anomalies, that are threatening to the organizational network and/or the resources linked thereto.

The analytics system 100 is formed of four main modules, the analytics module 102, the storage module 103, the user interface module 104, and the optional alerting module 105. These modules 102, 103, 104, 105, are linked together, and are also linked to processors 107, including a central processing unit (CPU), which are part of the analytics system 100.

The analytics module 102 combines rule-based and statistical-based approaches, to establish profiles of normal behavior, and detects deviations from these profiles. Each network entity activity is scored with a number which reflects the extent of its abnormality.

The analytics module 102 uses rule-based and statistical-based analytics in conjunction, to maximize true detection rate and to lower the false-positive rate for detecting behavioral anomalies. The rule-based analytics uses pre-defined rules to determine whether a certain activity is considered as an anomaly. The statistical-based analytics create dynamic behavioral profiles, to reflect normal behavior. The profiles are dynamically created, as they are constantly being updated with input data from network activity. Input data is checked against these two analytics procedures. If deviations are found by either of them, then data is flagged as an anomaly and a corresponding alert is sent, by the alerting module 105, if present in the analytics system 100.

Rule-Based Analytics

Rule-based analytics makes use of pre-defined thresholds that define the boundaries of legitimate and illegitimate activities. Based on rules definitions, data properties are compared to thresholds. A property which exceeds a threshold limit is considered as anomaly. Rules may be either provided by the user or by pre-defined factory settings or by both.

The rule-based analytics performs steps including: 1. loading a current rules list; 2. receiving incoming log records; 3. checking log records against the rules and looking for deviations from them; and, 4. raising alerts whenever such deviations are detected.

For example, the following rules determine the criteria considered to be a normal sequence of credentials retrievals. Exemplary criteria may be:

Sequence of more than 3 credentials retrieval during 5 minutes time frame is abnormal.

Sequence of more than 8 credentials retrieval during 1 hour time frame is abnormal.

Sequence of more than 20 credentials retrieval during 8-hour time frame is abnormal.

Connecting to remote machine without previously performing a certain activity is abnormal.

Statistical-Based Analytics

The analytics module 102 is configured to perform processes including a training phase and a detection phase. In the training phase, automated analysis profiles are built for the normal behavior of network entity's activities. The analysis profiles are based on processing past log records, which were generated due to network entity activities, and looking for unique patterns that describe these activities. In the detection phase, the system compares network entity activity logs to the established profiles in real time, and issues alerts whenever deviations are detected.

The statistical-based analytics module 102 implements algorithms, for example, including those for detecting network entity activities during irregular hours, and, detecting irregular quantities (amounts) of user activities, on the organizational network, associated with an account for a machine on the organizational network, or associated with a machine on the organizational network. Additional processes and algorithms which may be implemented by the analytics module 102 include those disclosed in commonly owned U.S. patent application Ser. No. 14/061,835, entitled: Method and System for Detecting Unauthorized Access To and Use Of Network Resources with Targeted Analytics, filed on Oct. 24, 2013, the disclosure of which is incorporated by reference in its entirety herein.

Figure 2:
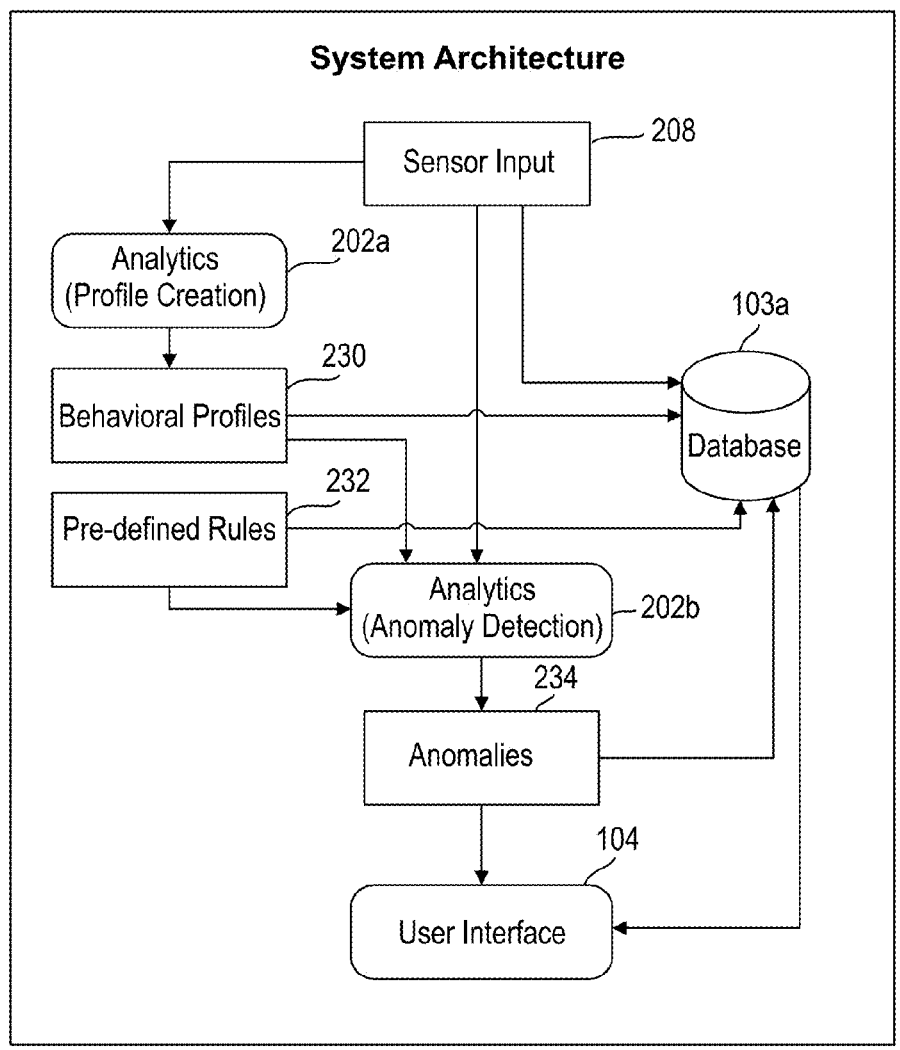
FIG. 2 is a diagram of the system architecture on which embodiments of the present invention are performed.

The storage module 103 operates to keep track of the different entities in the analytics system 100. The storage module 103 may be implemented, for example, by database (either relational or document) 103*a* (FIG. 2), which is used to store user activities and the corresponding analysis results. These entities include, for example, log records, anomalies, incidents and system status and to create a record for them in the database 103*a*. The storage module 103 performs three main steps, but is not limited to these three steps.

The first step includes maintaining the data structure of the behavioral profiles, which were created by the analytics module 102. The profile is a mathematical representation of an expected behavior that is created either as a result of the Profile Creation process of the analytics module 102 or by a manual rule definition. Hence, profiles that describe different behaviors are structured differently.

Figure 3:
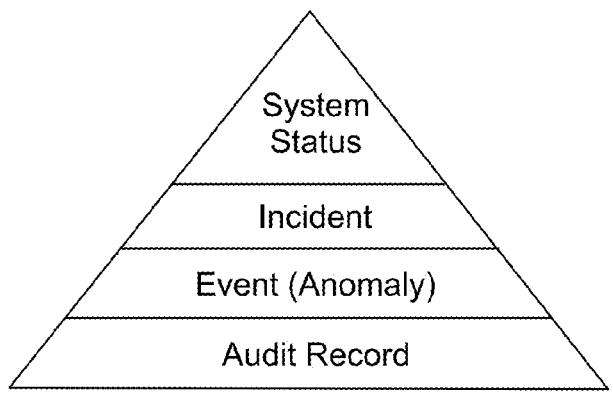
FIG. 3 is a diagram of the hierarchy of analytics entities.

The second step involves maintaining a hierarchic structure of the different level of analytics entities. This list includes audit record, which is used as the raw data to analytics and event, incident and system status, which are entities that the analytics yields. Each entity is described by a different data structure. FIG. 3 illustrates the hierarchy of the analytics entities in the system. Each entity is at certain level, as the result of the analysis of one or more entities in the lower level. These relationships will be further discussed at the analytics module 102 section. The third step involves interfacing with the database 103*a* to fetch/store these entities. The storage module 103 stores the different data records to the database 103*a* (FIG. 2) and fetches them upon a request of the analytics module 102, or the user interface module 104.

Turning to FIG. 4, exemplary data structures in the storage module 103 are shown, and implemented, for example, in a database 103*a*. This database 103*a* includes, a data structure representative of a working hours profile 402, and analytics entries. These analytics entries include, an audit record data structure 404*a*, an event data structure 404*b*, an incident data structure 404*c*, and a system status structure 404*d*. For these analytics entries 404*a*-404*d*, each data structure holds pointers to the next successive entity (the entity below it), and in accordance with the hierarchy diagram of FIG. 3. For example, system status data structure 404*d* holds one or more pointers to incident data structure 404*c*. An incident data structure 404*c* holds one or more pointers to event data structure 404*b*. An even data structure 404*b* holds one or more pointers to audit record data structure 404*a*.

Figure 5:
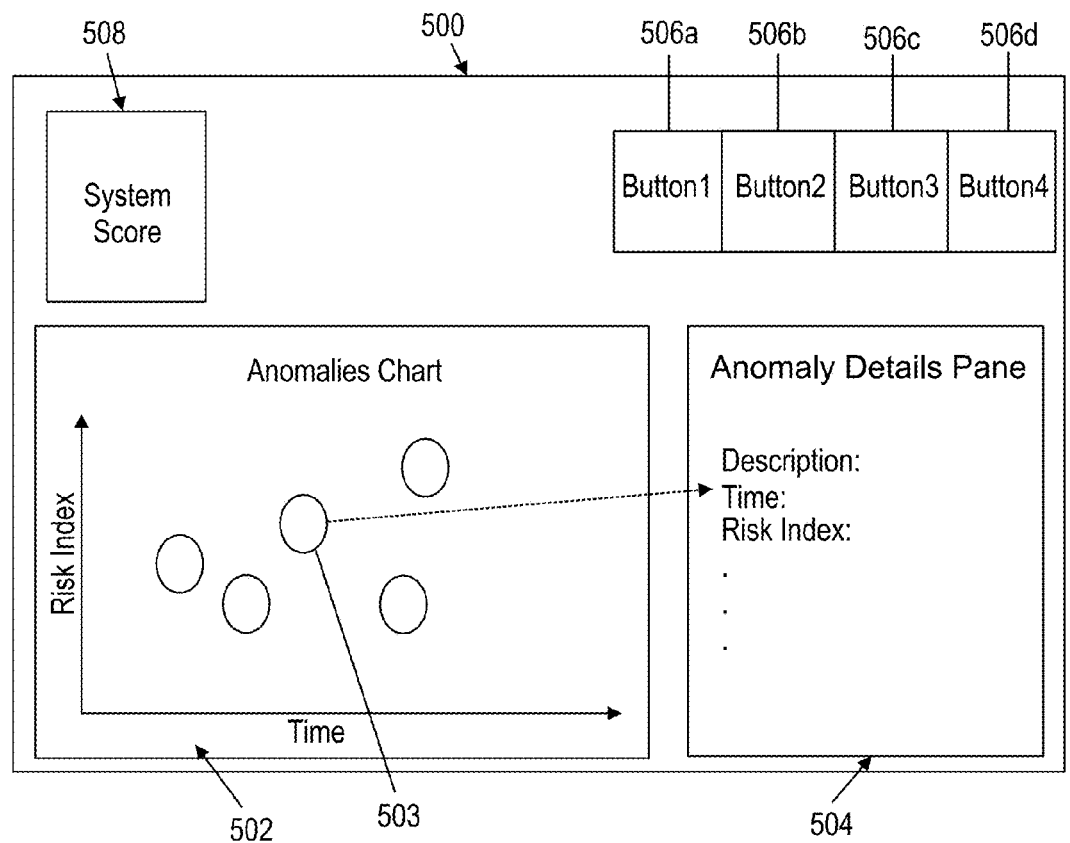
FIG. 5 is a user interface in accordance with embodiments of the present invention.

The User Interface Module 104 provides the user, e.g., system administrator 21, with information about detected anomalies and prompts the system administrator 21 to investigate and mitigate these incidents. The user interface module 104 displays detected anomalies over time, enabling their investigation. The interface 500, shown in FIG. 5, is suitable for reviewing exiting and past anomalies. It is particularly useful for system that provides overall status of current anomalies in conjunction with layered or drill-down capabilities to support investigation procedures.

The interface module 104 performs the following steps, including, receiving real-time data through an automated process, displaying various analytics data on an organized dashboard, monitoring user's mouse (or other pointing device) movements, and responding to these movements within a reasonable time frame, and, signaling a failure when a predetermined time interval elapses and new data has not been received.

The user interface module 104 includes graphical elements, as shown in FIG. 5. These elements include an anomalies chart 502, which displays exiting and past anomalies, according to selected time frame. Within the chart 502, anomalies are ranked according to their scores, which represent the severity as calculated by analytics module 102. The anomaly details pane 504 displays a summary of the chosen anomaly 503. The summary may include, but is not limited to, parameters such as identification (ID), time, risk index, and risk label. There are action buttons 506a-506d. These action buttons 506a-506d enable the user, e.g., system administrator 21, to perform various actions on anomalies upon clicking. The actions may include: escalating the anomaly to a manager, marking an anomaly as false-positive, and/or terminate anomaly handling. There is also a system score display 508.

The system score is an overall risk index which is derived from the number of detected anomalies and their level of severity. The risk index could have numeric or alphabetical representation, which indicates a continuous or discrete risk level.

Turning back to FIG. 2, an architecture for the analytics system 100 is shown. Input data, indicative of user 20 behavior for an account, on the organizational network 50, or associated with a resource 110 on the organizational network 20 is shown as sensor input 208, received from the sensors 108. The sensor input 108 is directed to the analytics module 102, which includes submodules for profile creation 202a and anomaly detection 202b. The sensor input 208 is also moved to the database 103a of the storage module 103.

The profile creation submodule 202a creates behavioral profiles 230, which are sent to the anomaly detection submodule 202b and the database 103a. A rules submodule 232, organizes, arranges and stores predefined rules, which are sent to the anomaly detection submodule 202b and the database 103a.

The anomalies detection submodule 202b functions to detect anomalies, and sends the detected anomalies, to submodule 234. This submodule 234 passes the detected anomaly to the database 103a and the user interface module 104, where it may be observed by the system administrator 21, for example, on the graphic user interface 500 (FIG. 5).

Attention is again directed to the analytics module 102. This module 102 implements the aforementioned statistical based analytics via programs including algorithms which: 1. detect user activity during irregular hours; and, 2) detect an irregular number or quantity of user activities.

Detection of User Activities During Irregular Hours

Figure 6:
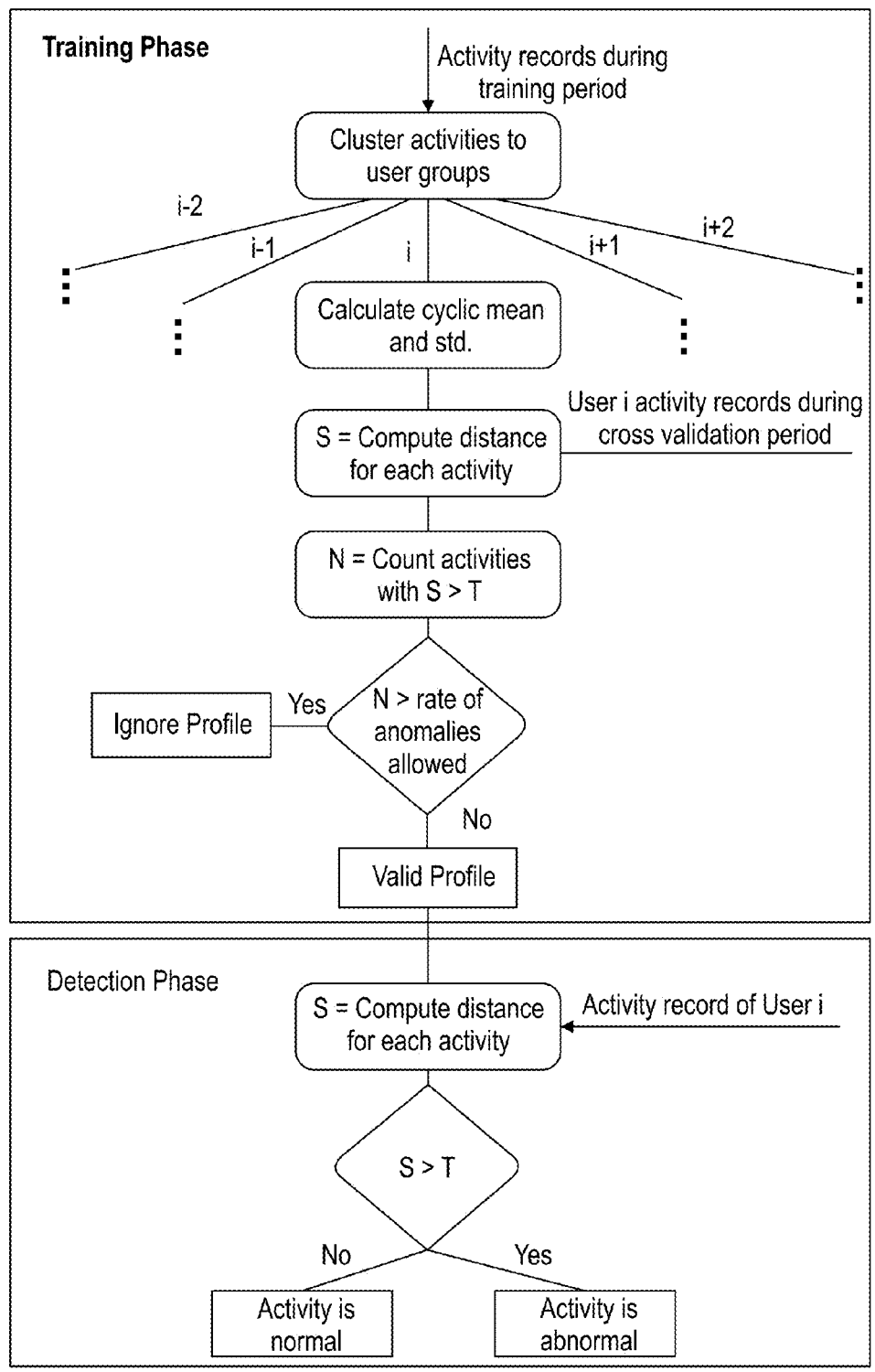
FIG. 6 is a flow diagram of a process for detecting activities during irregular hours in accordance with embodiments of the present invention.

Attention is now directed to FIG. 6, which details a process including a training phase, followed by a detection phase. During the training phase, the algorithm analyzes the training data to create a unique profile for each user in the organization. The training data (Aij) is a two dimensional array of timestamps where each represents an activity (j) that was performed by a certain user (i). First, the algorithm divides the training dataset into two separate datasets: the first one, bounded by dates TS and TE (user defined) is used for profile calculation. Each activity that occurred during this period of time and by the same user is taken into account when computing a cyclic mean (Ci1) and std (Ci2) for this user. These pairs of values define the time frame during which the user normally performs activities.

The second dataset is used for cross validation in order to guarantee that the existing profile genuinely describe a user's behavior. For each activity (Bij) that occurred between dates TE and TC, a cyclic score is (S) calculated. The score (S) is checked against a normality threshold (T). If S is bigger than T, then this activity is considered anomaly. If more than X % activities were classified as abnormal, the calculated user profile is considered non credible and thus ignored. The other profiles are used through the detection phase.

In the detection phase, the user activities are processed upon arrival. The algorithm calculates a cyclic score (S) of each user activity by considering the profile parameters (Ci1,Ci2) for that user. The score is measured as a distance from the average in standard deviations units. Low deviations are not considered anomalies due to the confidence margin. High deviations are flagged as anomalies and displayed on the user interface 500. In conjunction with this detection phase, a score is calculated for each anomaly found.

The training phase comprises the following steps, as listed in Table 1:

Define threshold T (standard deviation units).
Define X - percentage of allowed anomalies allowed in cross validation.
Define the training period start date (TS), end date (TE) and cross validation end date(TC)
Take all user activities Aij -Time of activity number j of user i, which dates between TS and TE
Take all user activities Bij -Time of activity number j of user i, which dates between TE and TC
For each user i:
Compute C(i, 1)- mean (Ai1, Ai2, . . ., AiN)
Compute C(i, 2) - std (Ai1, Ai2, . . ., AiN)
For each activity Bij:
Compute S - cyclic_distance (Bij, Ci1, Ci2)
If S > T:
Bij is anomaly
If rate anomalies in Bi is bigger than X:
User profile is ignored.

The detection phase comprises the steps listed in Table 2:

For each activity X (assuming performed by user i):
Compute S - cyclic_distance(X, Ci1, Ci2)
If (S > T * std):
X is anomaly.
Calculating Anomaly Score:
green_area = 2 (std), red_area = 3 (std), high_conv = 0.9
mid_point = (green_area + red_area)/2
norm_factor = -log(1/high_conv-1) / ((red_area-green_area)/2)

$t=(s-\text{mid\_point})*\text{norm\_factor}$ $\text{score}=1/(1+\exp(-t))$

The cyclic distance of Tables 1 and 2 is calculated in Table 3, as follows:

x,y - hours in 24 hours format
cyclic_distance (x,y):
res = min(abs(X-Y), abs(24+X-Y));
res = min(res, abs(-24+X-Y));

Detection of Irregular Quantity and Density of User Activities

Figure 7A:
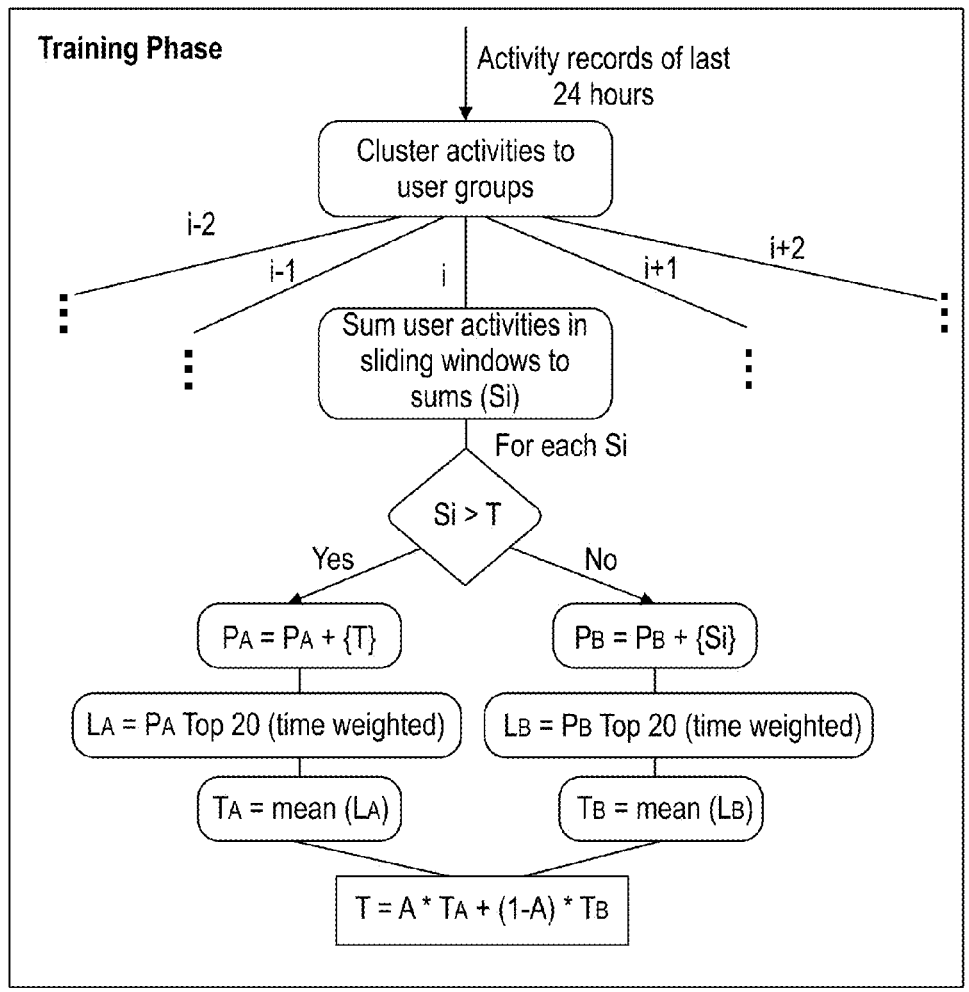
FIGS. 7A and 7B are flow diagrams of processes for detecting irregular amounts of activity in accordance with embodiments of the present invention.
Figure 7B:
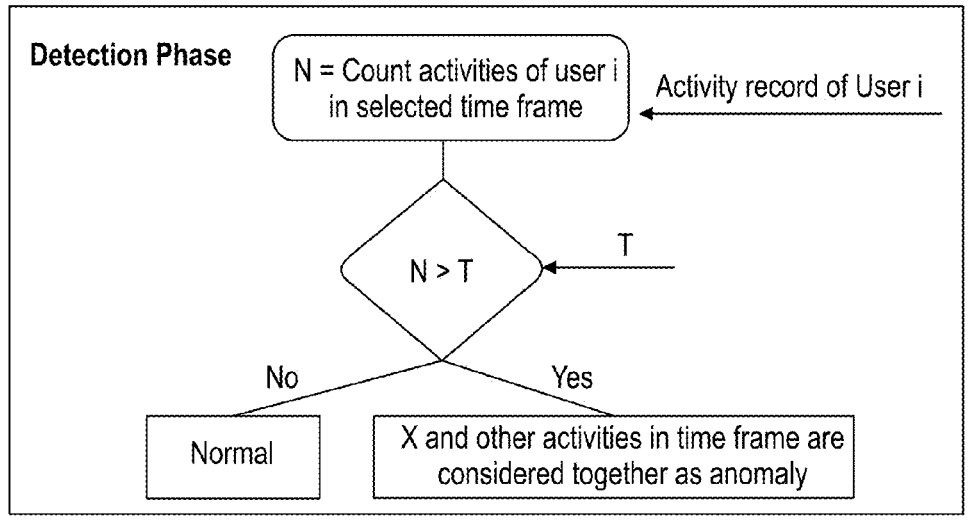

Turning to FIGS. 7A and 7B, a training phase is a continuous process that is initiated periodically every 24 hours during which the algorithm of FIG. 7A analyzes the training data set that was gathered in the last 24 hours. The training data is a two dimensional array of timestamps where each represents an activity that was performed by a certain user. The algorithm continuously calculates two parallel profiles (PA,PB) for each user in the organization and for each time frame (e.g., 5 minutes, 1 hour and 8 hours). Each profile provides for any given time the upper bound of quantity of activities that is considered normal. While establishing the profiles, the engine considers past user behavior. To establish Profile A historical anomalies are considered, as they may represent a new behavioral trend whereas Profile B ignores them. The real threshold is a derived by a combination of Profile A and B at any given moment.

In the detection phase in the algorithm of FIG. 7B, the user activities (X) are processed upon arrival. For each activity, a sum of activities during the different time frames is calculated (N). Then, this value is compared to current threshold (T), which is the real profile at that time. If N is bigger than T, then this activity and the other activities in the time frame are considered as an anomaly and corresponding score is computed.

For the aforementioned algorithms of FIGS. 7A and 7B, and described immediately above, Table 4 provides definitions as follows:

DEFINITIONS

TF—Time frame: 5 minutes, 1 hour or 8 hours.
Define threshold T for each time frame
Alpha—Mixing factor
The training phase comprises the following steps, as listed in Table 5:

---
Every 24 hours, calculate the sum (Si) of user activities on last 24 hours using sliding windows in length denoted by TF.
Parallel profiling: manage two parallel profiles at all time: PA, PB. Each profile is list of sums that represent historical values of windows, weighted by time - the newer the value is the more weight is gets. Profiles are updated as following:
Compare each new sum (Si) against current threshold T.
If Si is bigger than T, then add T profile PA (trimming). Otherwise, add original Si to profile PB.
Weighting: weigh all values of each profile by time.
Create list A (LA) and list B (LB) - 20 highest values of corresponding profile.
Compute profile threshold TA and TB - average of LA and LB respectively.
Compute an arbitrator (A) between TA and TB, depending on the ratio of trimming actions:
A = A * alpha + ratio of trimming in the last 24 hours.
Compute Threshold: T = A * TA + (1−A) * TB
---

The detection phase comprises the following steps, as listed in Table 6:

---
For every activity X:
N = Count activities of this user in time frame (TF)
If (N > T):
X and other activities in time frame (TF) are considered together as anomaly
Calculate Anomaly Score:
tmp = max(0,(N−T)/T)
--- scaling_param=2

*tmp=tmp*100/scaling_param score=min(100,*tmp*)

Parallel Profiles

A distinctive characteristic of the algorithm of FIGS. 7A and 7B is the usage of a Parallel Profiling technique. This technique may be generalized and used by other algorithms as described below.

Figure 8:
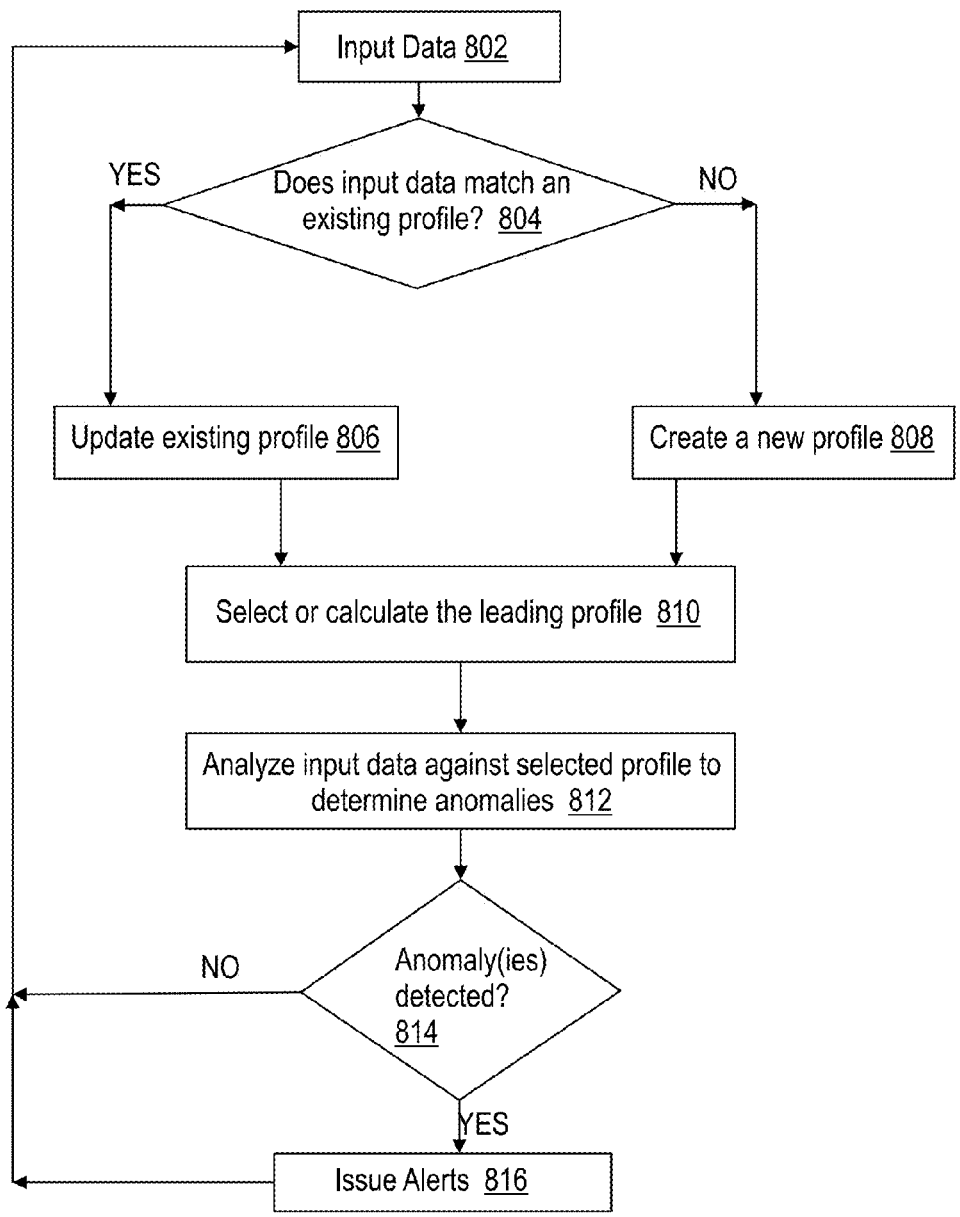
FIG. 8 is a flow diagram of a process for parallel profiles in accordance with embodiments of the present invention.

The algorithm for parallel profiling is shown as a flow diagram in FIG. 8. It is used during the training or during continuous learning phase. Anomalies may be used as a regular sample, and therefore used for profile creation. However, should the anomaly be an outlier, it may be considered as a noisy sample, and accordingly, filtered out.

A detected anomaly may be one of three:
either an actual detected anomaly, which should generate an alert,
or a noisy sample, representing a statistically insignificant event in the system, which shouldn't generate an alert or a beginning of a new trend—for example, when a user changes their working hours, the first activity log record will be an anomaly, but if repeated over period it should be considered the new normal behavior, thus resulting in a new leading profile.

The suggested algorithm attempts a solution by managing two or more profiles in parallel. Each sample in the training dataset is tested according to certain criteria (context-dependent), and as a result the relevant profile is updated.

Turning to FIG. 8, at block 802, input data is received from the sensors 108, by the analytics system 100. The process moves to block 804, where it is determined whether the input data matches an existing profile (or several existing profiles), stored in the storage module 103 (e.g., database 103a) of the analytics system 100. By "match" it is meant that there is not a significant deviation from the profile, i.e. there not being an anomaly.

Should the input data match an existing profile, at block 804, the process moves to block 806, where the profile is updated, with this input data. However, should the input data not match an existing profile, at block 804, the process moves to block 808, where this input data is used in creating a new profile. The profiles, existing and newly created, are representative of the same metrics associated with user behavior. Metrics of network entity behavior include parameters such as, for example, time of day, access distribution for a specific user or a group of users, originating internet protocol (IP) addresses distribution for a specific user or group of users, the user's rate of access to a target of privileged account, and the time of day or time of week access for a specific target or privileged account, the day of the week a specific resource is accessed on, whether a specific command is run on a workday/holiday/business hours/non-business hours, date, rate of input, IP or IP range, geographical location, type of events, success/failure indication, input metadata, and, input content.

From blocks 806 and 808, the process moves to block 810, where the leading profile, which may be either an existing profile or a new profile, is selected or calculated for the input data. This selection is performed for example, by a weighting function. The weighing function may be a simple choosing of one profile over the others as the leading profile (this represents the weight of "1" to that one profile and "0" to others), but it also may be a different weights on the existing profiles, for example 0.5 for the two most prominent profiles, or 1/n for each of the n profiles representing the behavior of the specific network entity.

The process moves to block 812, where, for the respective profile selected, the input data is analyzed against the selected profile for anomalies, such as behavioral anomalies of the user 20. The anomalies are detected by the aforementioned statistical analytics or rule based analytics, as detailed above. At block 814, to which the process moves from block 812, it is determined whether anomalies have been detected.

Should anomalies not have been detected, at block 814, the process returns to block 802, where the system 100 awaits the next input data. Should anomalies have been detected at block 814, the process moves to block 816, where the alerting module 105, if present, is triggered to issue alerts. Should the alerts have been issued, or were not issued as the alerting module was not present in the system 100, the process returns to block 802, where the system 100 awaits the next input data.

Elevation Program

Figure 9A:
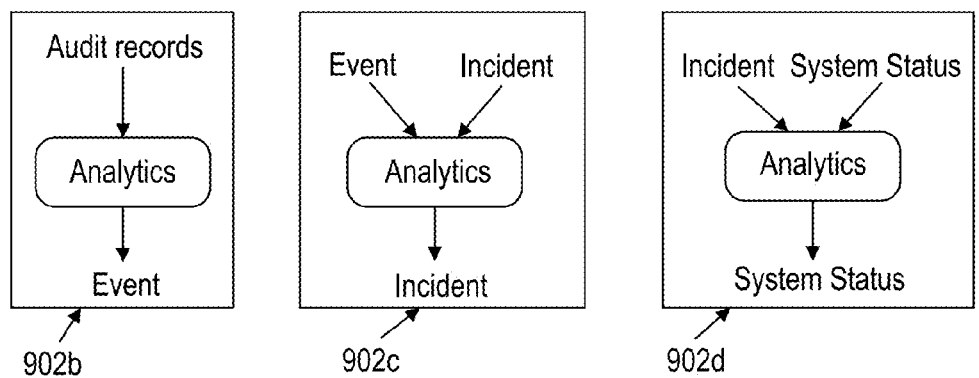
FIG. 9A shows diagrams of relationships between analytics entities.
Figure 9B:
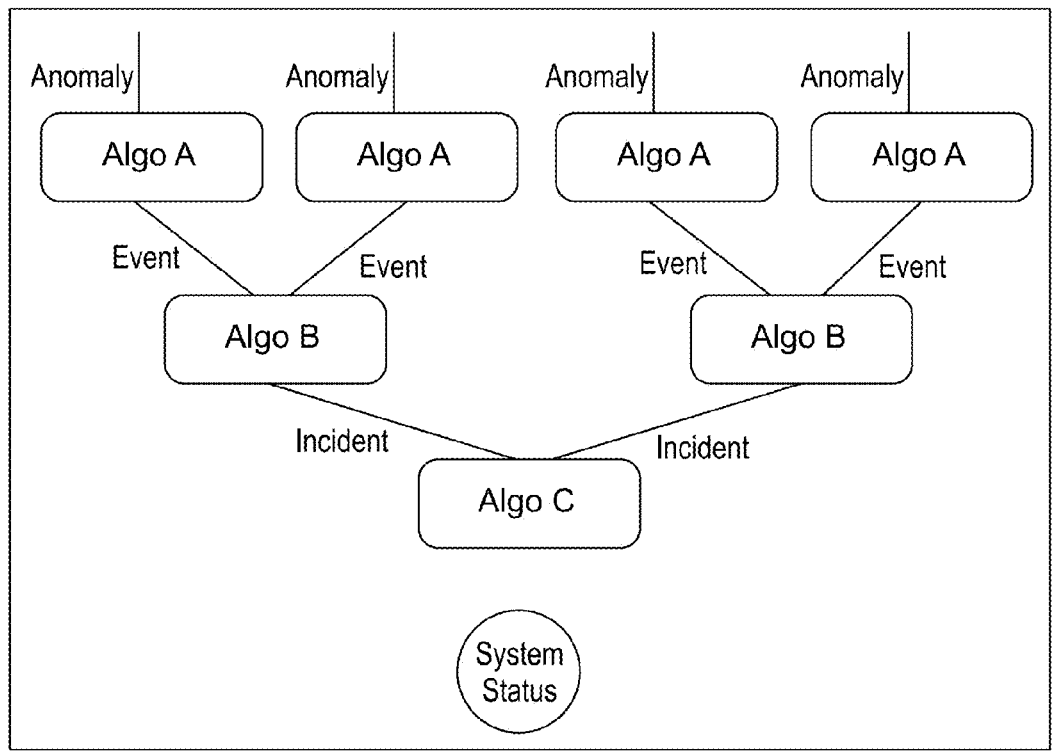
FIG. 9B is a flow diagram of an elevation process in accordance with embodiments of the present invention.

The analytics module 102 employs an Elevation Program including an algorithm, of FIG. 9B, which implements heuristics to elevate a lower-level analytics entity to a higher one. Analytics entities are the basic structures that describe the analysis results. The entities are: Audit Record, Event, Incident and System Status. FIG. 9A demonstrates these relationships as hierarchical, Audit Records to Events 902*b*, Events to Incidents 902*c*, and Incidents to System Status 902*d*, in accordance with the chart of FIG. 3.

Once a new anomaly is detected, the elevation algorithm, of FIG. 9B, updates the analytics entities. This is done by first creating an event (Algorithm (Algo A of FIG. 9B). The event is the analytics entity that represents an anomaly. The algorithm determines whether an anomaly should be escalated to a system event. Several heuristics are taken into account, one such heuristic being checking whether the anomaly score has passed a certain threshold.

Second, an incident is created and/or updated (Algo B of FIG. 9B). The incident includes one or more events, which are grouped together by a common parameter. New events may be added to an already existing Incident if they share a common parameter. In this case the incident is "updated" rather than "created". There are numerous parameters, according to which events may be grouped together. These parameters include: 1. User—The user who performed the activity; 2. Application—The application that used to perform the activity; 3. Source IP—The machine that initiated the activity; 4. Destination IP—The target machine on which the activity was performed; and, 5. Time—The time when the activity was performed.

Third and finally, the system status is created and/or updated (Algo C of FIG. 9B). The system status is a numerical indication to the extent of which the system "thinks" that the organization is currently under attack. The system status score is the result of number of incidents and their scores. The elevation algorithm weighs the current incidents in the system and their scores and determines the system status score, a number ranges 1 to 100. A general rule is that the more incidents which are existing in the system with higher scores, the higher is the system status score.

Reporting System

The system 100 also produces interactive reports to users, e.g., system administrators, in the form of incidents and a system score for each incident. Feedback from the system administrator is obtained for each incident. This feedback is used to guide future learning of the system 100 when analyzing incidents.

Figure 10:
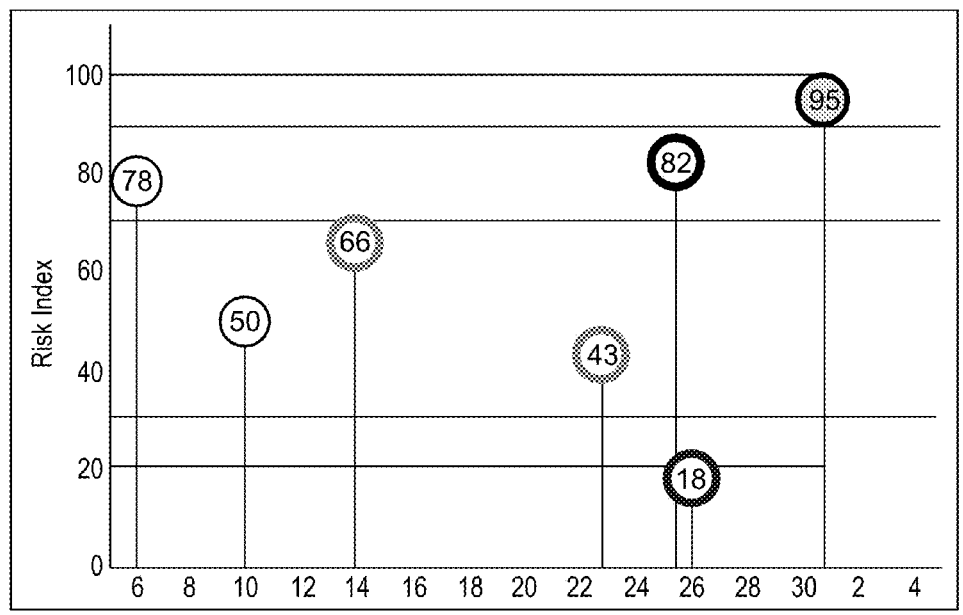
FIG. 10 shows a chart for a dashboard, which details each of the incidents over time, according to some embodiments of the present invention.

FIG. 10 shows a chart for a dashboard, which details each of the incidents over time. The dashboard provides an overview of general system status for a selected period of time, as well as details about current and past incidents, and a summary of system activity over time. The dashboard presents all of this information in multiple graphic analyses of system activity and security incidents that enable the user, e.g., system administrator, to view and understand system activity based on the graphics presented. The incidents over time are displayed on the chart of FIG. 10. The chart displays incidents in the system 100 over the selected timeframe and shows their severity using the following display features:

Color—Incidents are displayed as colored bubbles, according to one of three risk levels. This enables the user to easily understand if suspicious activities occurred.

Severity score—Each bubble contains a score which denotes the severity attributed to the incident. Although the bubbles are placed at different levels on the chart, this score gives a precise indication of severity.

Frame—The frame around each bubble indicates the management status of the incident.

A heavy outline indicates that the incident has not yet been viewed by the user.

A light outline indicates that the incident has been viewed by the user.

Figure 11:
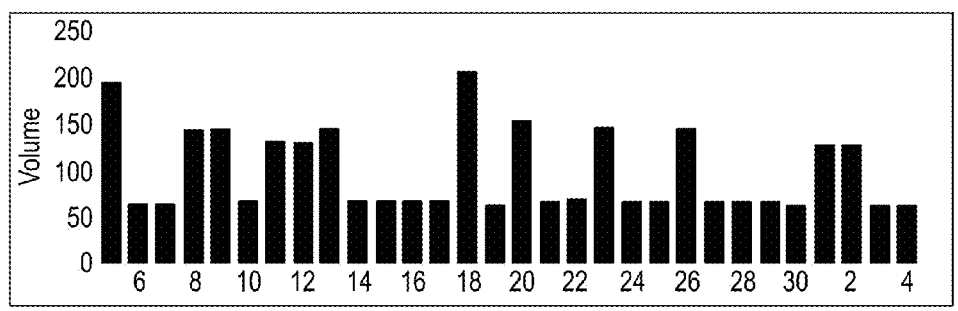
FIG. 11 shows a diagram of a summary of normal events in the system over the selected period of time, according to some embodiments of the present invention.

FIG. 11 shows a diagram of a summary of normal events in the system 100 over the selected period of time. This provides the user with a comparison between activities and anomalies. This information is displayed in a bar chart that indicates the number of activities and the date when they occurred.

Figure 12:
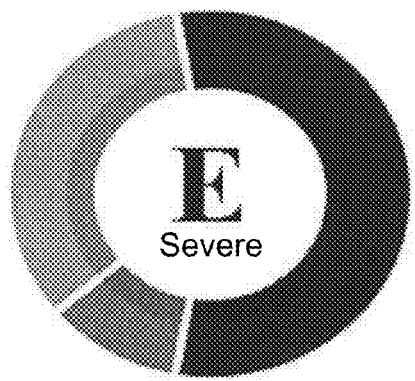
FIG. 12 is a chart of risk index and overall system score, according to some embodiments of the present invention.

The System Score is an overall risk index which is derived from the number of detected incidents and their level of severity. As shown in FIG. 12, different risk levels are identified by color. In addition, the overall risk label appears in the center of the chart. This gives the user an immediate overview of the current overall system risk.

Figure 13:
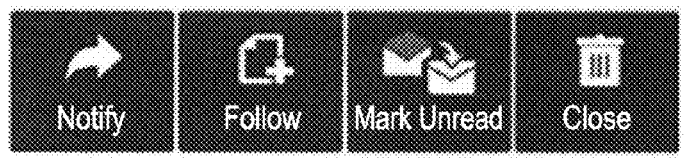
FIG. 13 shows a details pane of an incident summary, according to some embodiments of the present invention.

FIG. 13 shows a details pane displaying a summary about the select incident (incident summary). This information includes description of the incident, current risk index and status.

FIG. 14 shows an incident graph. This graph displays the risk level of the incident over time and the distribution of events in the incident.

FIG. 15 shows an incident details page, which provides details about a selected incident. This enables the user to view a break-down of events and the current status and risk of the incident. Using this information, the user can investigate incidents and mitigate them to ensure a lower risk environment.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term analytics system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for managing a parallel profiling paradigm for a common network entity in a network, comprising:

using at least one hardware processor of at least one server for:

building, based on analysis of actions documented in an input data and associated with a network entity in a computer network, a first entity behavioral profile for said network entity, said first entity behavioral profile reflects first metrics associated with behavioral characteristics of said network entity;

monitoring additional actions in additional input data to identify one or more anomalies from said first entity behavioral profile;

using said one or more anomalies as a regular sample for building at least one second entity behavioral profile for said network entity; wherein said first entity behavioral profile and said at least one second entity behavior profile are representations of expected behaviors of the network entity, said at least one second entity behavioral profile reflects second metrics associated with said behavioral characteristics of said network entity, wherein said first metrics and said second metrics are different from one another and said behavioral characteristics comprise at least two members of a group consisting of:

time of day or time of week of network events of by said network entity, access distribution of said network entity, distribution of originating internet protocol (IP) addresses of said network entity, a rate of access to a target by said network entity, a rate of input by of said network entity, a geographical location of said network entity, and type of network events initiated by of said network entity;

managing said first entity behavioral profile and said at least one second entity behavioral profile in parallel for analysis of further additional actions of said network entity in said computer network;

calculating, according to at least one of: said first entity behavioral profile and said second entity behavioral profile, a leading entity behavioral profile for said network entity; and using said leading entity behavioral profile for a detection of further anomalies in said further additional actions of said network entity in said computer network.

2. The computer-implemented method of claim 1, additionally comprising, obtaining user feedback obtained through an interface, wherein said detection is further based on said obtained user feedback.

3. The computer-implemented method of claim 1, further comprising calculating a system status score of said computer network indicative whether said computer network is compromised.

4. The computer-implemented method of claim 1, wherein said network entity is a member of a group consisting of: a human user, an application, a client machine, a device, an account and a command.

5. The computer implemented method of claim 1, wherein said building said first entity behavioral profile is performed before said building said at least second entity behavioral profile.

6. The computer implemented method of claim 1, wherein said building said first entity behavioral profile is performed in parallel to said building said at least second entity behavioral profile.

7. The computer implemented method of claim 1, wherein said leading entity behavioral profile is a member of a group consisting of: said second entity behavioral profile and a combination of said first entity behavioral profile and said second entity behavioral profile.

8. The computer implemented method of claim 1, wherein said one or more anomalies are identified based on a deviation of said analyzed additional input data from said first entity behavioral profile.

9. The computer implemented method of claim 1, further comprising upon receiving additional input data that is different from said first input data and from said second input data, updating, based on analysis of said additional input data, at least one of said first entity behavioral profile and said second entity behavioral profile.

10. Computer implemented method of claim 9, further comprising updating said leading entity behavioral profile based on said updating said at least one of said first entity behavioral profile and said second entity behavioral profile.

11. The computer-implemented method of claim 1, wherein said using comprises issuing an alert indicative of said further anomalies based on said detection.

12. A computer system for managing a parallel profiling paradigm for a common network entity comprising:
at least one non-transitory computer readable storage medium having program instructions embodied therewith;
at least a processor configured to execute said program instructions, said program instructions comprising:
code instructions for building, based on analysis of actions documented in an input data and associated with a network entity in a computer network, a first entity behavioral profile for said network entity, said first entity behavioral profile reflects first metrics associated with behavioral characteristics of said network entity;
code instructions for monitoring additional actions in additional input data to identify one or more anomalies from said first entity behavioral profile;
code instructions for using said one or more anomalies as a regular sample for building at least one second entity behavioral profile for said network entity, said at least one second entity behavioral profile reflects second metrics associated with said behavioral characteristics of said network entity, wherein said first metrics and said second metrics are different from one another and said behavioral characteristics comprise at least two members of a group consisting of:
time of day or time of week of network events of by said network entity,
access distribution of said network entity,
distribution of originating internet protocol (IP) addresses of said network entity,
a rate of access to a target by said network entity,
a rate of input by of said network entity,
a geographical location of said network entity, and
type of network events initiated by of said network entity;
code instructions for managing said first entity behavioral profile and said at least one second entity behavioral profile in parallel for detection of one or more further anomalies in further additional actions of said network entity in said computer network; and
code instructions for calculating, according to at least one of: said first entity behavioral profile and said second entity behavioral profile, a leading entity behavioral profile for said network entity; and
code instructions for using said leading entity behavioral profile for a detection of further anomalies in said further additional actions of said network entity in said computer network;
wherein said first entity behavioral profile and said at least one second entity behavior profile are representation of expected behaviors of the network entity.

13. A computer program product for managing a parallel profiling paradigm for a common network entity, the computer program product comprising a non-transitory computer readable storage medium having program instructions embodied therewith, the program instructions executable by a processor to cause one or more servers to:
building, based on analysis of actions documented in an input data and associated with a network entity in a computer network, a first entity behavioral profile for said network entity, said first entity behavioral profile reflects first metrics associated with behavioral characteristics of said network entity;
monitor additional actions in additional input data to identify one or more anomalies from said first entity behavioral profile;
use said one or more anomalies as a regular sample for building at least one second entity behavioral profile for said network entity, said at least one second entity behavioral profile reflects second metrics associated with said behavioral characteristics of said network entity, wherein said first metrics and said second metrics are different from one another and said behavioral characteristics comprise at least two members of a group consisting of:
time of day or time of week of network events of by said network entity,
access distribution of said network entity,
distribution of originating internet protocol (IP) addresses of said network entity,
a rate of access to a target by said network entity,
a rate of input by of said network entity,
a geographical location of said network entity, and
type of network events initiated by of said network entity;
manage said first entity behavioral profile and said at least one second entity behavioral profile in parallel for detection of one or more further anomalies in further additional actions of said network entity in said computer network; and
calculate, according to at least one of: said first entity behavioral profile and said second entity behavioral profile a leading entity behavioral profile for said network entity; and
use said leading entity behavioral profile for a detection of further anomalies in said further additional actions of said network entity in said computer network;

wherein said first entity behavioral profile and said at least one second entity behavior profile are representation of expected behaviors of the network entity.

14. The computer program product of claim 13, wherein said program instructions are adapted to cause the one or more servers to determine whether said computer network is compromised based on said farther anomalies based on user feedback obtained through an interface.

15. The computer program product of claim 13, wherein said program instructions are adapted to cause the one or more servers to calculate a system status score of said computer network indicative whether said computer network is compromised.

16. The computer program product of claim 13, wherein said network entity is a member of a group consisting of: a human user, an application, a client machine, a device, an account and a command.

* * * * *